US006779956B2

(12) United States Patent
Strumolo et al.

(10) Patent No.: US 6,779,956 B2
(45) Date of Patent: Aug. 24, 2004

(54) FOLDING CARGO CONTAINMENT APPARATUS FOR AN AUTOMOBILE

(75) Inventors: Gary Steven Strumolo, Beverly Hills, MI (US); Chad Nathan Cook, Dearborn Heights, MI (US); John W. Jaranson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,112

(22) Filed: Sep. 18, 2002

(65) Prior Publication Data

US 2004/0052605 A1 Mar. 18, 2004

(51) Int. Cl.⁷ .................................................. B60P 7/08
(52) U.S. Cl. ........................... 410/121; 410/94; 410/129
(58) Field of Search ............................... 410/121, 129, 410/140, 94; 296/37.5, 37.6; 224/403, 42.33, 42.34, 404; 220/520, 531

(56) References Cited

U.S. PATENT DOCUMENTS

| | | | |
|---|---|---|---|
| 1,595,929 A | * | 8/1926 | Rhodes |
| 4,718,584 A | | 1/1988 | Schoeny |
| 4,770,579 A | * | 9/1988 | Aksamit ..................... 410/150 |
| 4,838,745 A | * | 6/1989 | Haydock .................... 410/121 |
| 4,941,784 A | * | 7/1990 | Flament ..................... 410/121 |
| 5,265,993 A | * | 11/1993 | Wayne ....................... 410/129 |
| 5,526,972 A | | 6/1996 | Frazier et al. |
| 5,586,850 A | * | 12/1996 | Johnson ..................... 410/138 |
| 5,709,512 A | * | 1/1998 | Smith ........................ 410/129 |
| 5,839,865 A | | 11/1998 | Schmidt ..................... 410/127 |
| 5,865,580 A | * | 2/1999 | Lawrence ................... 410/118 |
| 5,975,819 A | * | 11/1999 | Cola .......................... 410/129 |
| 6,053,553 A | | 4/2000 | Hespelt |
| 6,109,847 A | * | 8/2000 | Patel et al. ................. 410/129 |
| 6,174,116 B1 | * | 1/2001 | Brand ........................ 410/140 |
| 6,183,177 B1 | * | 2/2001 | Dahlgren .................... 410/100 |
| 6,206,624 B1 | * | 3/2001 | Brandenburg ............... 410/132 |
| 6,234,733 B1 | * | 5/2001 | Parr ........................... 410/94 |
| 6,244,802 B1 | * | 6/2001 | Stanesic et al. .............. 410/94 |
| 6,454,501 B1 | * | 9/2002 | Parker ........................ 410/149 |
| 6,503,036 B1 | * | 1/2003 | Bequette et al. ............. 410/94 |

FOREIGN PATENT DOCUMENTS

FR 2669872 A1 * 6/1992 ............... 224/42.33

* cited by examiner

Primary Examiner—Stephen Gordon
(74) Attorney, Agent, or Firm—Gigette M. Bejin

(57) ABSTRACT

A cargo containment apparatus is formed from a series of individual panels linked together to permit deployment in a variety of configurations for containing cargo items within a larger cargo area of an automotive vehicle. The linked panels of the cargo containment apparatus are pivotable relative to one another to permit substantial flexibility in the apparatus to attain a shape that corresponds to the items to be transported in the cargo area. The panels are can be formed with bag hooks that can be engaged with the handles of conventional plastic grocery bags and tote bags for effectively restraining movement thereof within the automotive cargo area. Pins on the bottom surfaces of the panels engage the carpet in the automotive cargo area to restrict the movement of the cargo containment apparatus within the automotive cargo area.

18 Claims, 6 Drawing Sheets

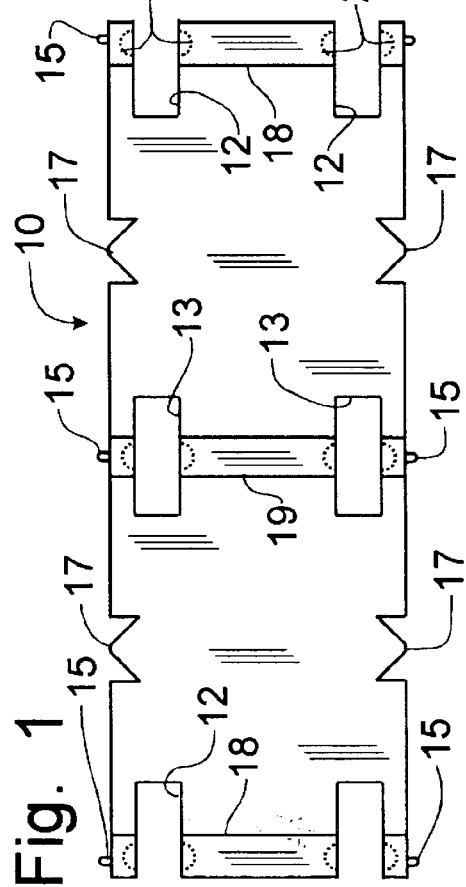
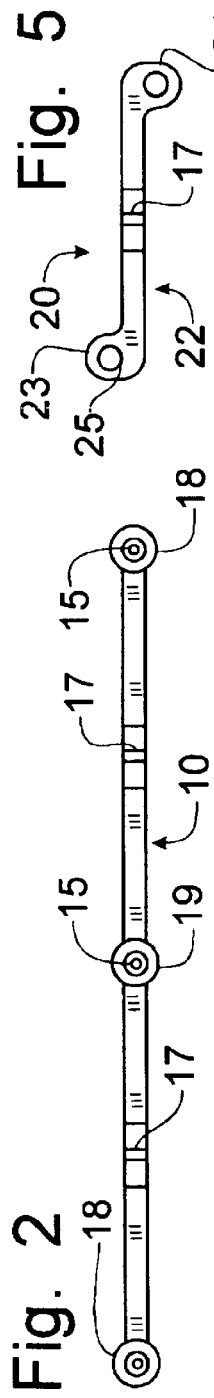
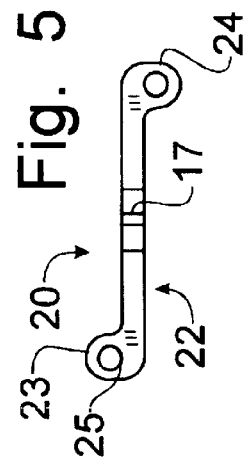
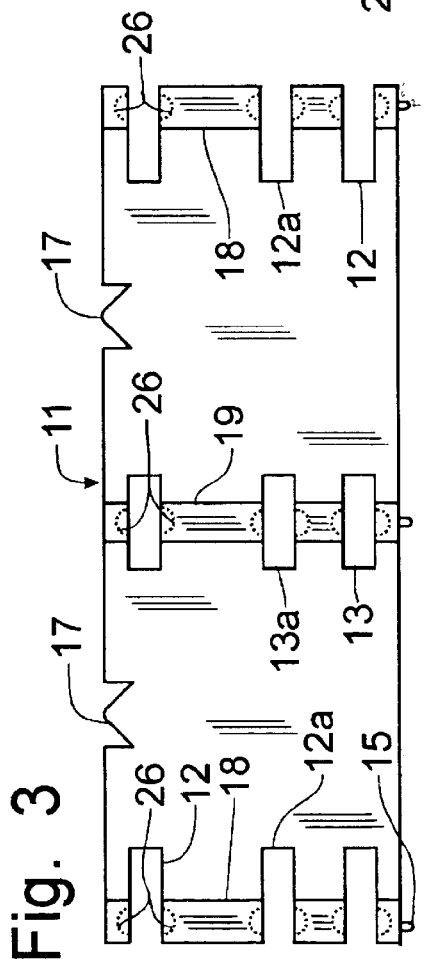
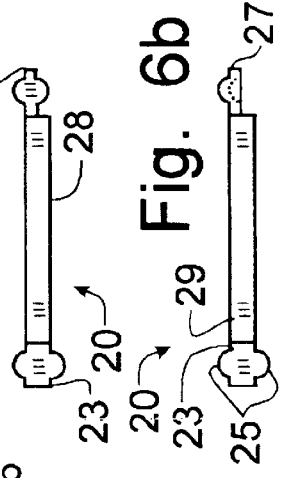
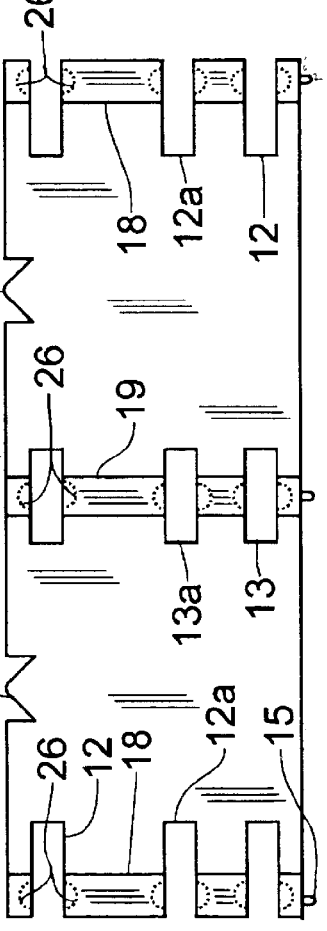

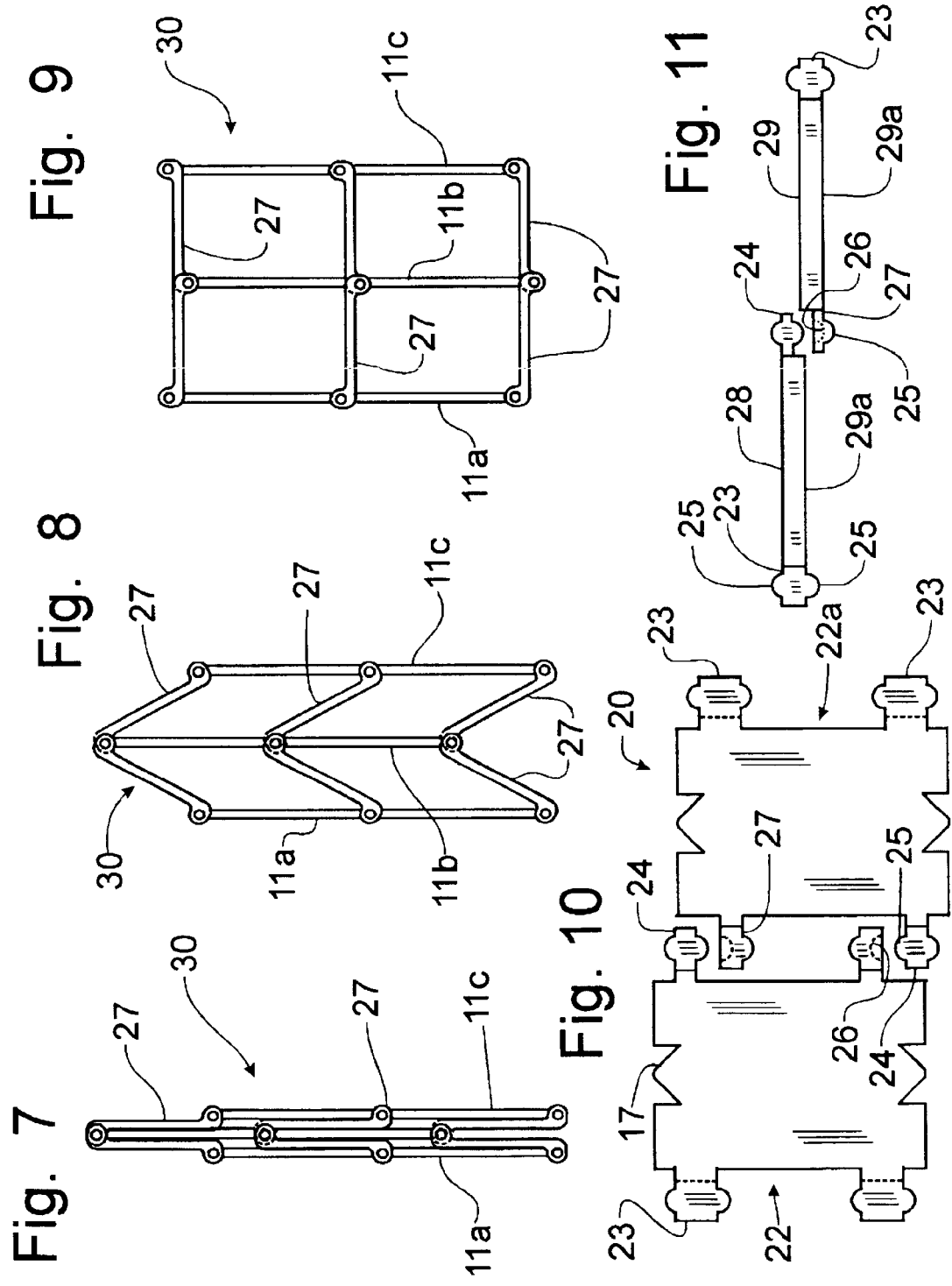

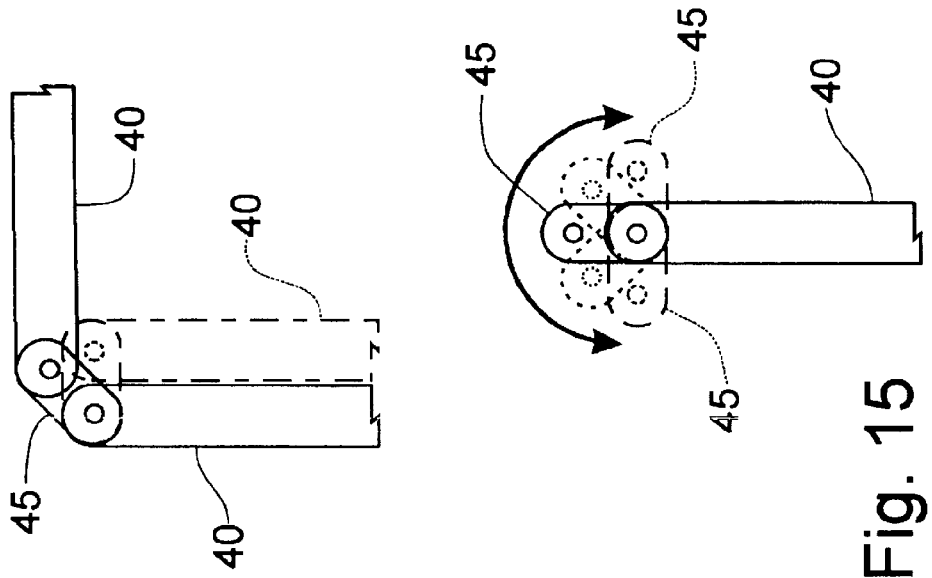
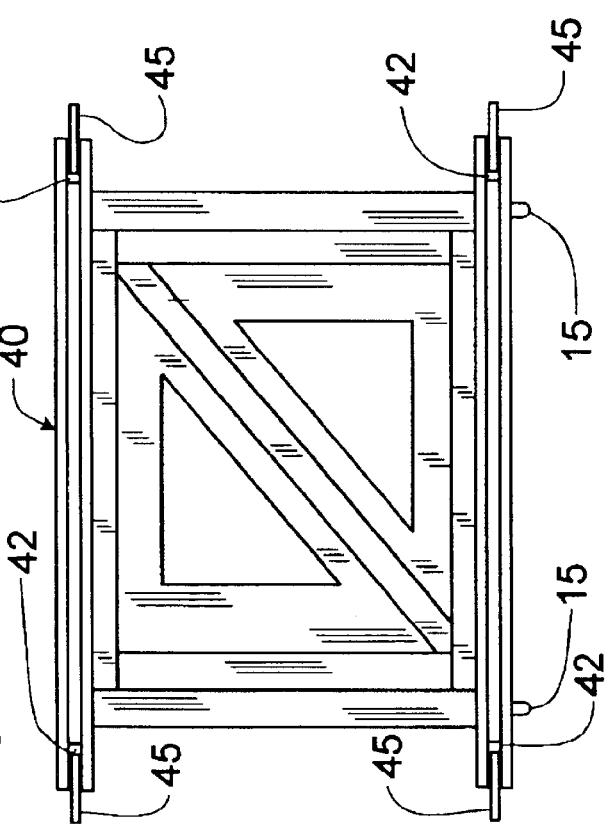
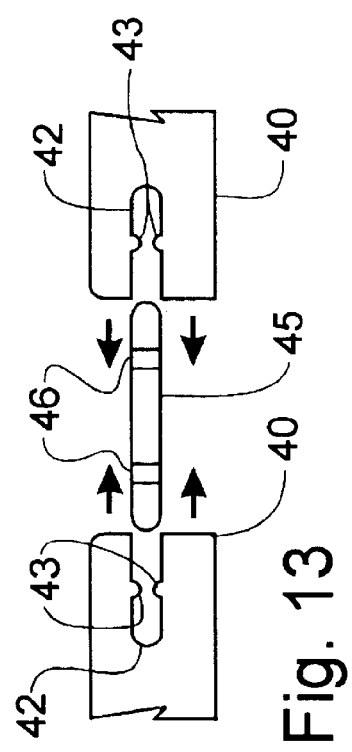

FOLDING CARGO CONTAINMENT APPARATUS FOR AN AUTOMOBILE

BACKGROUND OF INVENTION

1. Field of the Invention

This invention relates generally to a folding apparatus for use in the trunk or cargo area of an automobile and, more particularly, to an apparatus that is configurable in multiple orientations to organize and contain variable volumes of items to be placed into the automobile cargo area.

2. Background of the Invention

Automobile cargo areas come in many shapes and sizes from the trunk of a compact car to the open cargo area in the rear of a van. Typical utilization of these cargo areas involves the placement of items that are of a size, both individually and collectively, significantly smaller than the overall storage capacity of the respective cargo area. For example, a typical usage of the cargo area would be to store groceries that have been placed in bags at the grocery store to transport the groceries from the store to a residence. Grocery bags, as an example, are not generally stable and will frequently shift within the confines of the automobile cargo area, often spilling the contents to scatter over the entire cargo area. The effect can range from annoyance to damage of the items being transported.

Automobile manufacturers have provided a variety of hold down devices from straps to netting. While these devices can operate to restrain items, such as grocery bags against a wall of the cargo area, these devices do not provide the flexibility to customize in shape to the area or shape needed to conform to the collective group of the items being transported.

U.S. Pat. No. 4,718,584, (Schoeny) was issued on Jan. 12, 1988, teaches a pop-up organizer for use in the cargo area of automotive station wagons and hatchbacks. This device can be folded into a compact inoperative transport configuration against the floor of the trunk area, and then turned upright to open into an operative configuration forming compartments against the outer walls of the cargo area into which items can be placed to control the shifting and movement thereof. The Schoeny device operates in substantially the same manner as the tie down straps and netting to trap items against a wall of the cargo area. Furthermore, there is little flexibility to adapt the size and shape of the device to conform to the items being transported.

U.S. Pat. No. 5,526,972 (Frazier), issued on Jun. 18, 1996, provides a very similar device to the Schoeny device, except that the organizer is intended for use in the open rear cargo area of a pick-up truck. Like Schoeny, the Frazier device traps items against the outer walls of the cargo area, specifically the tail gate of the bed of the pick-up truck, and provides nearly identical function and operation to tie down straps and netting. Like Schoeny, Frazier provides only limited flexibility in adapting to the size and shape of the items being transported in the cargo area.

U.S. Pat. No. 5,839,865 (Schmidt) was issued on Nov. 24, 1998, and is directed to a movable apparatus for mounting in the trunk or cargo area of an automotive vehicle. This apparatus has a mounted member and a movable member interconnected by a scissor linkage that expands and contracts in conjunction with an actuator to push items places into the trunk rearwardly against the back wall of the trunk. As with the other prior art devices noted above, the Schmidt apparatus traps the items against the rear wall of the cargo area. While the position of the movable member is variable along essentially the entire length of the trunk, there is still only limited flexibility to adapt the size and shape of the area captured between the movable member and the rear wall of the cargo area to conform to the overall size and shape of the items being transported. Furthermore, a powered device like Schmidt would have limited utilization in a van or sport utility vehicle in which the rear wall of the cargo area is also the door through which access to the cargo area is gained.

U.S. Pat. No. 6,053,553 (Hespelt), was issued on Apr. 25, 2000, and is directed to an apparatus somewhat similar to the Schmidt device described above. Like Schmidt, the Hespelt apparatus has a fixed member and a movable member that expands toward the opposite wall of the cargo area. The Hespelt apparatus includes a locking device that fixes the position of the movable member by engaging a track installed into the floor of the cargo area. Hespelt provides an expandable area that can change in size, but has very little ability to conform to different shapes of items being placed into the trunk.

It would be desirable to provide an apparatus that can be utilized in the cargo areas of automobiles to adapt in size and shape to the items to be transported without requiring extensive installation and capital investment. It would also be desirable that such a flexible device be capable of removal from the cargo area or at least folded into a compact transport configuration that utilized a minimal amount of storage area in the trunk or cargo area.

SUMMARY OF INVENTION

It is an object of this invention to provide a foldable cargo containment apparatus that can be formed into multiple configurations in the cargo area of an automobile to restrain and organize items to be transported in the cargo area.

It is another object of this invention to provide a cargo containment apparatus that converts between a folded transport configuration into an opened operative configuration to provide a variably configurable orientation for holding items to be transported in an automotive cargo area.

It is a feature of this invention that the cargo containment apparatus can be configured into multiple shapes and sizes to conform to the volume and shape of the items to be transported.

It is an advantage of this invention that the cargo containment apparatus is sufficiently flexible to be configured to adapt in shape to a wide variety of items to be transported.

It is another feature of this invention that the walls of the cargo containment apparatus are adapted with bag hooks to be engaged with the plastic handles on conventional plastic grocery bags.

It is another advantage of this invention that the bag hooks on the walls of the cargo containment apparatus can restrain movement of plastic grocery bags within the cargo area.

It is still another feature of this invention that the walls of the cargo containment apparatus are provided with pins projecting downwardly to engage the carpet on the floors of automotive cargo areas to prevent the cargo containment apparatus from sliding over the floor of the automotive cargo area.

It is still another object of this invention to provide a cargo containment apparatus that is formed from a plurality of individual panels linked together to permit relative movement between the individual panels while maintaining a linked configuration.

It is yet another feature of this invention that the linked panels of the cargo containment apparatus can be pivoted relative to one another to provide a wide variety of sizes and shapes of the area contained within the linked panels.

It is yet another advantage of this invention that the linked panels can be folded into a compact shape for transport within the cargo area or removed for storage in a remote location.

It is still another advantage of this invention that the linked panels and links can be manufactured from recycled plastic or other suitable materials to provide sufficient rigidity when placed into an operative configuration to contain items placed within the confined area for transport.

It is a further feature of this invention to provide panel and link components that can be simply and easily assembled and utilized within the cargo area of an automobile.

It is yet another object of this invention to provide a three panel cargo containment apparatus that has opposing connecting links offset to permit the three panels to be folded into a flat configuration for transport.

It is a further object of this invention to provide a multiple panel cargo containment apparatus having individual panels connected by links that provide a continuous linked hinge.

It is still a further object of this invention to provide a cargo containment apparatus that is durable in construction, inexpensive of manufacture, carefree of maintenance, facile in assemblage, and simple and effective in use.

These and other objects, features and advantages are accomplished according to the instant invention by providing a cargo containment apparatus formed from a series of individual panels linked together to permit deployment in a variety of configurations for containing cargo items within a larger cargo area of an automotive vehicle. The linked panels of the cargo containment apparatus are pivotable relative to one another to permit substantial flexibility in the apparatus to attain a shape that corresponds to the items to be transported in the cargo area. The panels are can be formed with bag hooks that can be engaged with the handles of conventional plastic grocery bags and tote bags for effectively restraining movement thereof within the automotive cargo area. Pins on the bottom surfaces of the panels engage the carpet in the automotive cargo area to restrict the movement of the cargo containment apparatus within the automotive cargo area.

BRIEF DESCRIPTION OF DRAWINGS

The advantages of this invention will become apparent upon consideration of the following detailed disclosure of the invention, especially when taken in conjunction with the accompanying drawings wherein:

FIG. 1 is an elevational view of a first embodiment of a panel for use in a cargo containment apparatus, this specific panel is utilized in a three-panel embodiment of the cargo containment apparatus and is symmetrical to be bidirectional in utilization;

FIG. 2 is an end view of the panel shown in FIG. 1;

FIG. 3 is an alternative embodiment of a panel similar to that depicted in FIG. 1, but utilizing three connecting links at each vertical hinge, this alternative embodiment being unidirectional in utilization;

FIG. 4 is an elevation view of a connecting link in the form of an end panel to be connected to the main panels at the vertical hinge axes;

FIG. 5 is an end view of the end panel depicted in FIG. 4;

FIG. 6*a* is an elevational view of an alternative link member to the end panel of FIGS. 4 and 5;

FIG. 6*b* is an elevational view of a mating alternative link member corresponding to the link member of FIG. 6*a*;

FIG. 7 is a top plan view of the three-panel cargo containment apparatus formed from the panels and link members depicted in FIG. 1 6*b*, the cargo containment apparatus being oriented in the folded transport configuration;

FIG. 8 is a top plan view of the three-panel cargo containment apparatus of FIG. 7 but oriented in a partially opened configuration;

FIG. 9 is a top plan view of the three-panel cargo containment apparatus of FIGS. 7 and 8, but oriented in the fully opened configuration;

FIG. 10 is an elevational view depicting the connection of two end panels depicted in FIG. 4 to interconnect three main panels to form the cargo containment apparatus depicted in FIGS. 7–9;

FIG. 11 is an elevational view depicting the connection of two link members depicted in FIGS. 6*a* and 6*b* to interconnect three main panels to form the cargo containment apparatus depicted in FIGS. 7–9;

FIG. 12 is an elevational view of an alternative main panel embodiment;

FIG. 13 is an enlarged schematic elevational detail view depicting the snap connection of the link members between two individual panel members to form the multiple-panel cargo containment apparatus;

FIG. 14 is a partial top plan view of two interconnected panels of a multiple-panel cargo containment apparatus depicting the relative pivotal movement permitted by the arrangement of the panels and link members, the folded configuration of the main panels being shown in phantom;

FIG. 15 is a top plan view of a main panel as depicted in FIG. 12 with a connected link member, the range of pivotal movement of the link member being shown in dashed and phantom lines to either side of the main panel member;

DETAILED DESCRIPTION

Figure 16:
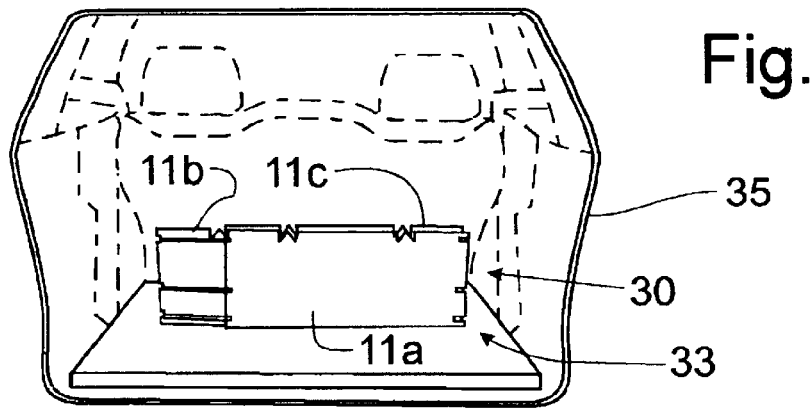
FIG. 16 is an elevational view of the rear cargo area of a vehicle, such as a sport utility vehicle, in which a three-panel cargo containment apparatus is position, the cargo containment apparatus being depicted in the folded transport position, though oriented upright prior to being deployed.

Referring to FIGS. 1–11, a first embodiment of a cargo containment apparatus incorporating the principles of the instant invention can best be seen. FIG. 1 is an elevational view of a main panel member 10 that can be used in a three-panel version 30 of the cargo containment apparatus. The main panel 10 has a height dimension that is preferably more than half the height of a conventional paper grocery bag, and a length dimension that is preferably more than twice the height dimension. The main panel 10 is formed with cutouts 12 within the hinge areas 18 at each opposing end, and centrally located cutouts 13 at a central hinge area 19, to permit the insertion of link members 20 for pivotally connecting at least three main panels 10, as will be described in greater detail below.

The first embodiment of the main panel 10 is symmetrical to permit the main panel to be used in any orientation. In alignment with the cutouts 12, 13, the top surface and the bottom surface of the main panel 10 is provided with pins 15 to engage the carpet commonly found in automotive cargo areas to limit the sliding movement of the main panels 10 during movement of the automotive vehicle. Also formed in a symmetrical manner are bag hooks 17 that are depicted in FIG. 1 as "W-shaped" notches that are positioned midway between the end and central cutouts 12, 13 on both the top and bottom surfaces of the main panel 10.

In FIG. 3, an alternative embodiment of the main panel 11 is shown. This alternative embodiment is asymmetrical in that the end and center cutouts 12, 13 are formed in the main panel 11 with the center cutout 12a, 13a of each respective set of cutouts 12, 13, is positioned closer to the bottom surface than to the top surface of the main panel 11. When the link members 20 are engaged with the main panel members 11 the bottom two link members 20 form a stable low barrier for items placed within the contained area formed by the cargo containment apparatus, as will be described in greater detail below. Since the alternative embodiment of the main panel 11 is unidirectional, only the top surface of the main panel 11 is formed with bag hooks 17. FIG. 2 reflects the top view of either of the main panel embodiments 10, 11.

Referring now to FIGS. 4 and 5, a first embodiment of the link members 20 can best be seen. The link members 20 are formed as end panels 22 having an enlarged pivot head 23 on one side thereof to correspond to the end cutouts 12. On the opposing side of the end panel 22 from the enlarged pivot heads 23 are a male half pivot head 24 and a female half pivot head 27. Each of the enlarged pivot heads 23 has a first and second vertically opposed rounded pivot knobs 25 that are sized and shaped to engage with the pivot knob sockets 26 formed in the hinge areas 18, 19 at the cutouts 12, 13. Similarly, each of the male half pivot heads 24 are formed with vertically opposing pivot knobs 25. The female half pivot head 27 is formed with one pivot knob 25 positioned on the interior side of the female half pivot head 27 and a vertically opposing pivot knob socket 26 on the exterior side of the female half pivot head 25.

The top plan view of the end panels 22 is best seen in FIG. 5. One skilled in the art will recognize that the pivot heads 23, 24 and 27 are offset from the main axis of the end panel to permit the three-panel version 30 of the cargo containment apparatus to fold substantially flat, as will be described in greater detail below. Like the main panels 10, the end panels 22 are formed with bag hooks 17 in the top and bottom surfaces thereof midway between the pivot heads 23, 24 and 27. Accordingly, the end panels are not exactly symmetrical, but once interconnected, as will be described below, a pair of interconnected end panels are symmetrical in appearance and could be used in a bi-directional capacity.

As best seen in FIG. 10, a pair of end panels 22 can be connected together to form a symmetrical end panel link member 20. One end panel 22 of the pair, the right member 22a in FIG. 10, is rotated 180 degrees so that the male and female half pivot heads 24, 27 are aligned with the corresponding male and female half pivot heads 24, 27 of the other end panel 22. In this orientation, as depicted in FIG. 10, the knob pivot socket 26 in the each female half pivot head 27 is aligned with the interior one of the pivot knobs 25 on the corresponding male half pivot head 24 to form, when connected together an enlarged pivot head member 23 that would correspond to the cutouts 12, 13 in the center main panel 10 of a three-panel configuration 30, as is best seen in FIGS. 7–9. Once assembled, the pair of end panels 22 will fit into the cutouts 12, 13 by snap fitting into engagement with the pivot knob sockets 26 in the respective hinge areas 18, 19.

Returning now to FIGS. 6a and 6b, an alternative embodiment of the link members 20 can best be seen. Instead of forming an entire end panel 22, the alternative link members 28, 29 are elongated links that incorporate the male and female half pivot head members 24, 27, as described above to form an enlarged pivot head 23 in a similar manner. The alternative embodiment of the link members 28, 29 are best paired with the alternative embodiment of the main panels 11 in that the respective sizes of the cutouts 12, 13 and the pivot heads 23, 24 and 27 are smaller to reflect the addition of the third or center cutout 12a, 13a. The formation of the alternate link members 28, 29 is similar in design to that of the end panels 22 described above in that the elongated links 28, 29, when assembled, form a generally continuous line, as is best shown in FIG. 11.

One skilled in the art will recognize that yet further alternative designs for the link members 28, 29 are possible. Specifically, the male and female half pivot heads 24, 27 do not have to make an enlarged pivot head 23 when joined together. Instead the male and female pivot heads 24, 27 could simply connect with the elongated link body 29a of one link 28 being located in a plane above the elongated link body 29a of the other link member 29. Such a configuration would further offset structural portions of the link members 28, 29 to aid in the ability of the three-panel configuration of the cargo containment apparatus to be folded flat.

The three-panel configuration 30 of the cargo containment apparatus can be seen best in FIGS. 7–9. Joined end panels 22 or alternative link members 28, 29 are fitted between three main panels 10 oriented in a parallel manner with the respective pivot heads 23, and 24 joined with 27, snapped into engagement with the cutouts 12, 13 so that the pivot knobs 25 are engaged into the pivot knob sockets 26 in the binge areas 18, 19 of the main panels 22. The three parallel main panels 10 can then be collapsed against one another and folded into a closed transport configuration, as shown in FIG. 7, which can be stored on the floor 33a in the cargo area of an automotive vehicle or at a remote location until needed. One main panel 10 is movable relative to the other main panels 10. For example, the three main panels 10 can be oriented into a partially opened configuration, as depicted in FIG. 8, or a fully opened position, as depicted in FIG. 9.

Figure 18:
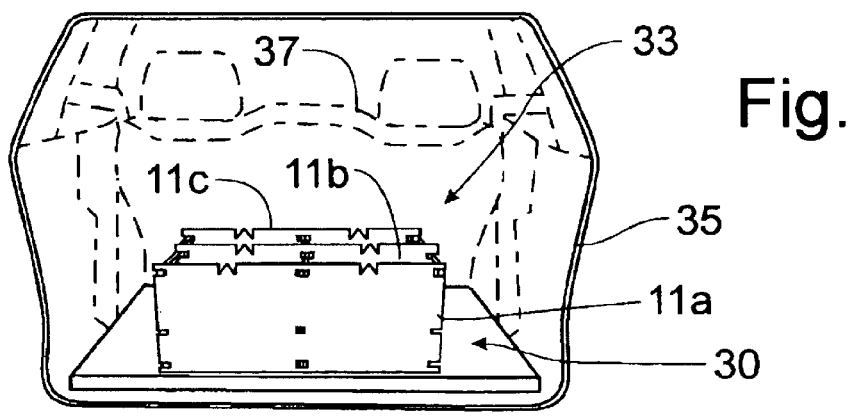
FIG. 18 is an elevational view of the rear cargo area as in FIG. 16, but with the three-panel cargo containment apparatus being fully deployed with dual contained cargo areas.

Referring now to the schematic views of FIGS. 16 18, deployment of the three-panel configuration 30 of the cargo containment apparatus in the cargo area 33 of an automotive vehicle 35, such as a sport utility vehicle or the like, can best be seen. Although these drawings depict the deployment of the cargo containment apparatus in a vertically open cargo area 33, such as is found in minivans and sport utility vehicles, the cargo containment apparatus would work as well in a conventional car trunk, although the height of the main panels 10, 11 may be limited by the overall depth of the conventional vehicle trunk area. In FIG. 16, the closed configuration of the three-panel cargo containment apparatus 30 is depicted with the apparatus 30 being positioned in an upright orientation for further deployment.

Figure 17:
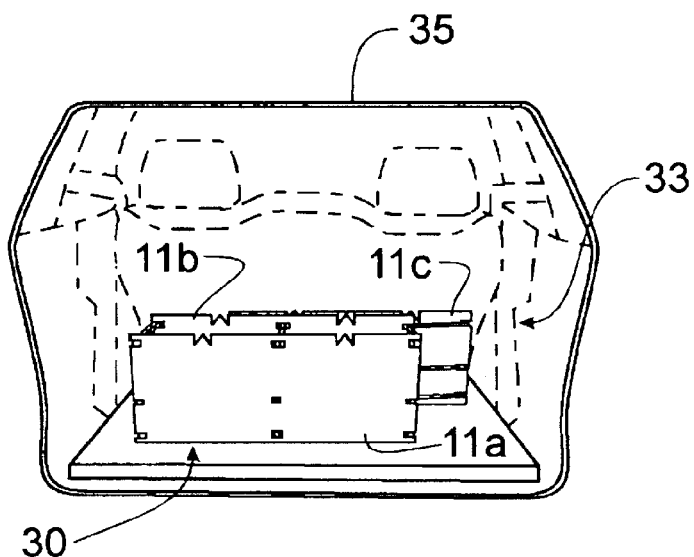
FIG. 17 is an elevational view of the rear cargo area as in FIG. 16, but with the three-panel cargo containment apparatus being partially deployed with a single contained cargo area.

In FIG. 17, the rear main panel 11c is pivoted against the center main panel 11b, while the front main panel 11a is moved fully away from the center main panel 11b into a variation of the partially opened position depicted in FIG. 8. In this configuration, a confined area between the front main panel 11a and the center main panel 11b provides a contained transport area for items, such as grocery bags for example, while the rear main panel 11c provides stability to the apparatus 30. The fully opened configuration as depicted in FIG. 9 is shown in FIG. 18, deployed in the cargo area 33 of the vehicle 35.

Referring now to FIGS. 12–15, an alternative main panel 40 can best be seen. The panel 40 is ideally suited for utilization in a multiple-panel configuration of the cargo containment apparatus 50 as will be described in greater detail below. The panel 40 is thin and elongated in design and is formed with pins on at least one side thereof to engage the carpet typically found in vehicle cargo areas to limit the movement of the apparatus 50 during movement of the vehicle 35.

The panel is also formed with hinge pockets 42 at the respective opposing ends thereof. Each hinge pocket 42 is formed with opposing pivot knobs 43 extending toward one another within the hinge pocket 42 to form a narrowed gap therebetween. As demonstrated in FIG. 13, a link member 45 formed with a pair of vertical through holes 46 can be snapped into the hinge pocket with the pivot knobs 43 engaged into the respective top and bottom portions of the corresponding through holes 46. A second panel 40 can then be snapped onto the opposing end of the link member 45 to form a hinged connection between adjacent main panels 40.

Figure 19:
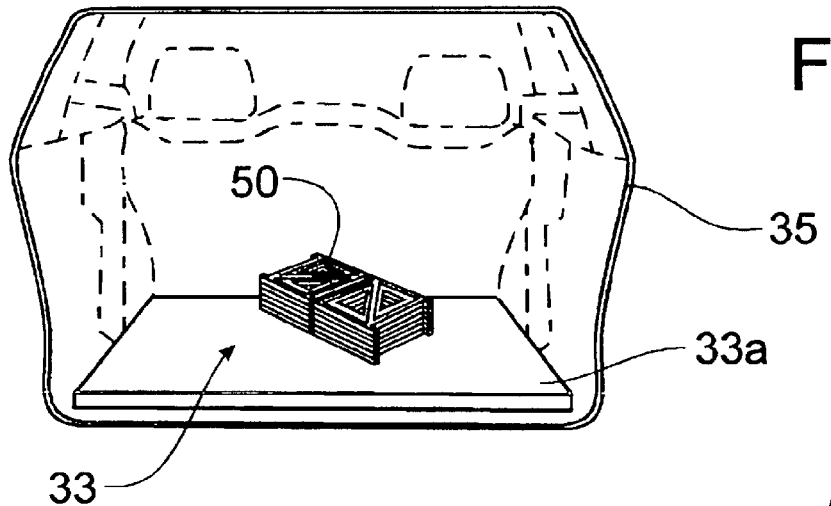
FIG. 19 is an elevational view of the rear cargo area as in FIG. 16, but having a multiple-panel cargo containment apparatus oriented in a folded transport position lying on the floor of the cargo area.

The result is that adjacent hinge panels 40 can pivot relative to one another about the engaged connections between the pivot knobs 43 and the through holes 46 as depicted in FIG. 14. As shown in FIG. 15, the link member 45 can pivot to either side of the panel 40 to which it is connected, limited only by the geometry of the other panels connected to one another. Preferably six to eighteen individual panels 40 are interconnected to form a multiple-panel cargo containment apparatus 50, with an optimum number being about twelve panels 40. The first and last panels 40 in the chain of linked main panels 40 can then also be linked to form a fully linked multiple-panel cargo containment apparatus 50 configured somewhat like a bicycle chain, i.e. a continuous hinge member, which can be folded flat and stored on the floor 33a of the cargo area 33, as is shown in FIG. 19, or at a remote location until needed. On the other hand, the first and last panels 40 do not have to be linked together, which may provide an even greater range of utilization or deployment.

Figure 20:
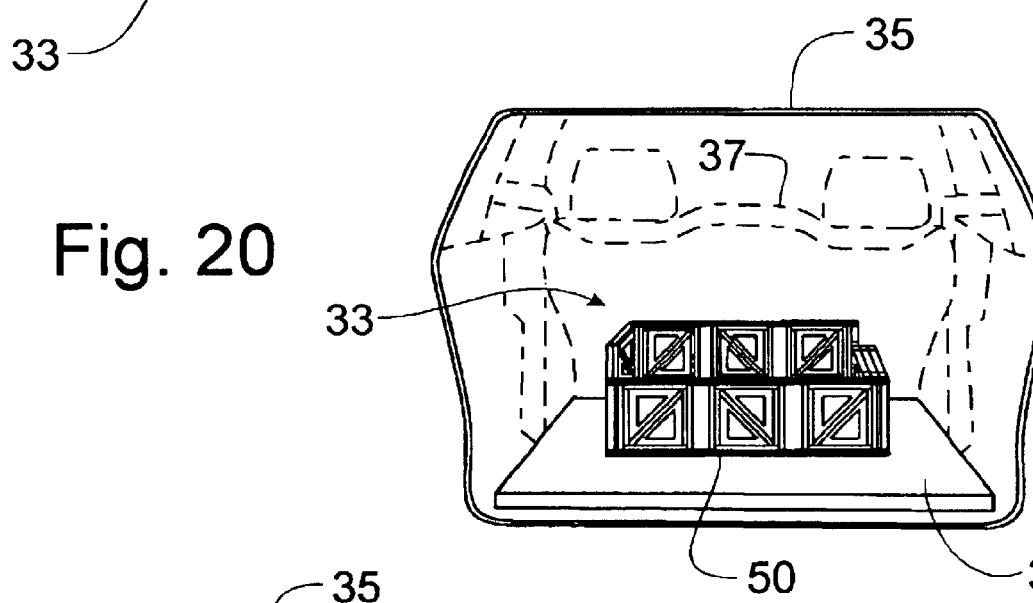
FIG. 20 is an elevational view of the rear cargo area as in FIG. 19, but with the multiple-panel cargo containment apparatus being deployed into a first configuration.
Figure 24:
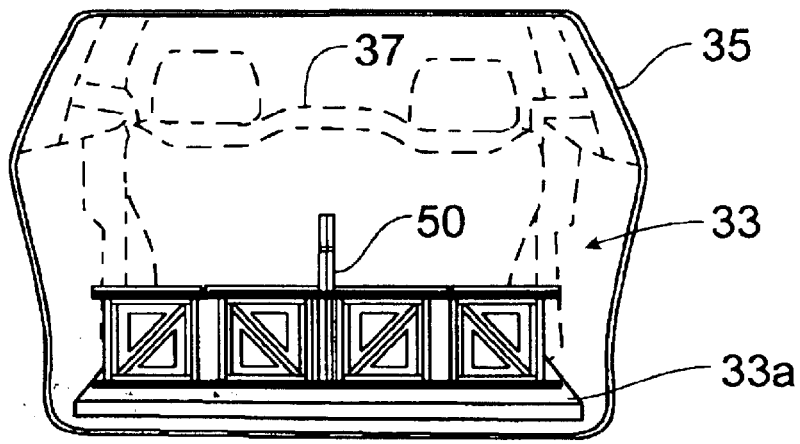
FIG. 24 is an elevational view of the rear cargo area as in FIG. 19, but with the multiple-panel cargo containment apparatus being deployed into a partitioning configuration to define at least three separate confined areas against the outer walls of the vehicle cargo area.

Referring now to FIGS. 19 24, deployment of the multiple-panel cargo containment apparatus 50 can best be seen. While FIGS. 20 24 depict a few representative configurations of the multiple-panel cargo containment apparatus 50, one skilled in the art will easily be able find many additional configurations to permit the cargo containment apparatus 50 to seek the specific size and shape of the item or items to be placed into the area confined by the linked panels 40. In FIGS. 19 24, an exemplary twelve panel cargo containment apparatus 50 is depicted.

Figure 21:
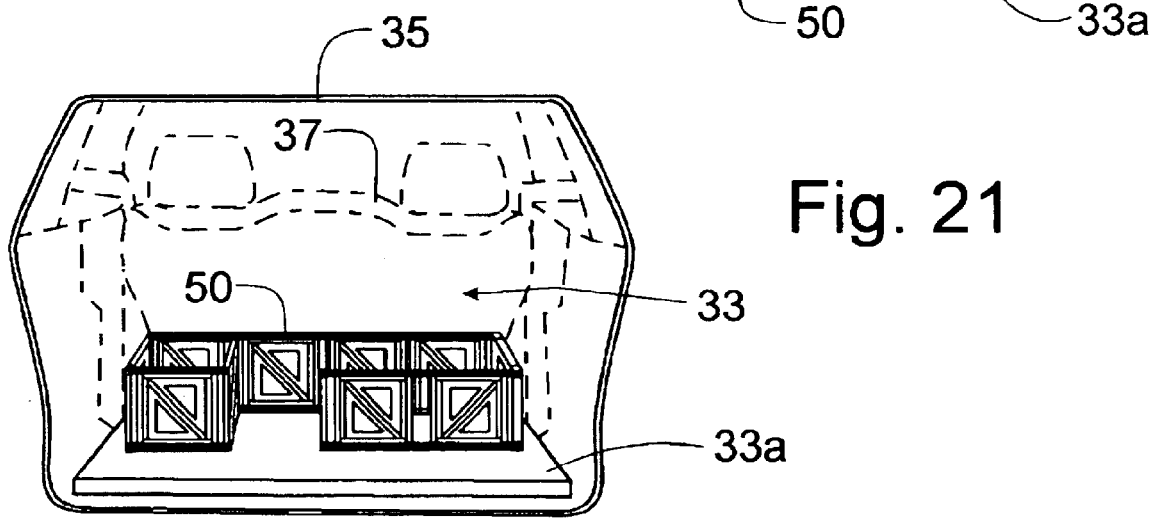
FIG. 21 is an elevational view of the rear cargo area as in FIG. 19, but with the multiple-panel cargo containment apparatus being deployed into a second configuration having dual confined cargo areas on opposing sides of the automobile cargo area.
Figure 22:
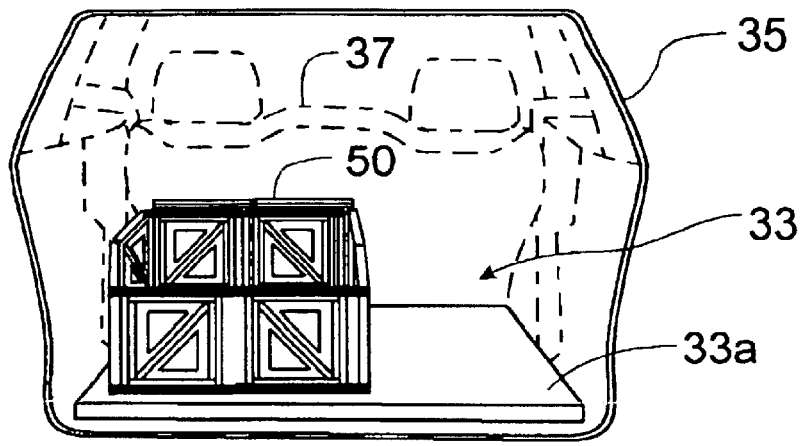
FIG. 22 is an elevational view of the rear cargo area as in FIG. 19, but with the multiple-panel cargo containment apparatus being deployed into a different configuration similar to that of FIG. 20, but having a smaller confined area.
Figure 23:
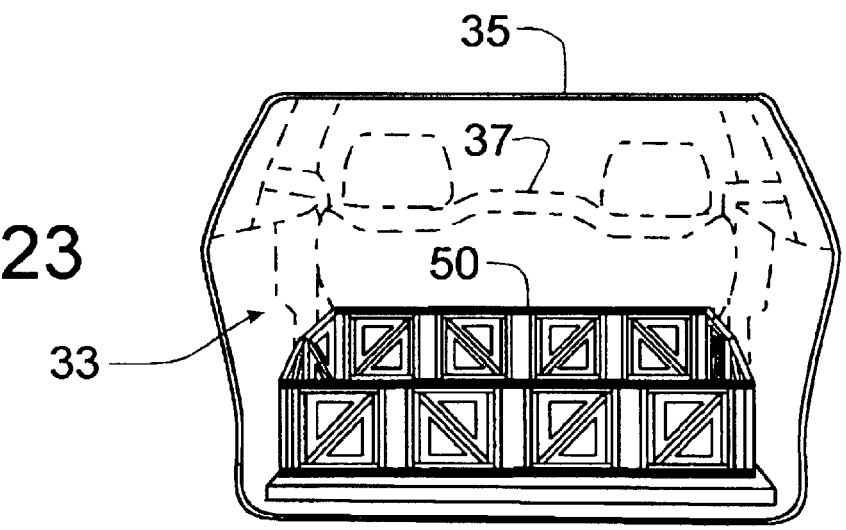
FIG. 23 is an elevational view of the rear cargo area as in FIG. 19, but with the multiple-panel cargo containment apparatus being deployed into a different configuration similar to that of FIGS. 20 and 22, but having a larger confined area.

In FIG. 20, a simple three panel wide by two panel deep configuration is depicted with the remaining linked panels 40 being folded to the side of the confined area. In FIG. 21, two separate confined areas on the floor 33a are defined by the apparatus 50, with a one panel wide by one panel deep area defined to the left side of the cargo area and a two panel wide by one panel deep area is defined to the right of the cargo area. In FIG. 22, a simple two panel by two panel area is confined by the apparatus 50 with the unused panels being folded into position between the apparatus 50 and the rear seat 37 of the vehicle 35. In FIG. 23, a maximum confined area for the twelve panel cargo containment apparatus for the representative cargo area 33, covering a substantial portion of the floor 33a, is depicted as a simple four panel wide by two panel deep configuration. Lastly, in FIG. 24, the panels 40 are doubled and arranged into a "T-shaped" configuration that defines at least three areas, two confined areas between the apparatus 50 and the rear seat 37 and one semi-confined area between the apparatus 50 and the cargo door (not shown).

As one skilled in the art can readily see, the multiple-panel cargo containment apparatus 50 provides substantial flexibility in conforming to a desired size and shape for the confined area to be defined within the boundaries of the apparatus 50. Preferably, the panels 10, 11, 22, and 40 are formed from lightweight plastic or other similar material to provide a light weight apparatus 30, 50 that can be deployed easily and conveniently, or stored into a folded configuration in the cargo area 33 or elsewhere remotely from the vehicle 35.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A cargo containment apparatus for use in the cargo area of an automotive vehicle comprising:

a plurality of main panel members pivotally connected by vertically spaced elongated link members to permit pivotal movement on each main panel member relative to an adjacent main panel member, said main panel members being movable between a plurality of positions to form a plurality of configurations for containing items within an area confined by said main panel members within said cargo area, said elongated link members being pivotally movable through a range of motion defining an arc of at least ninety degrees.

2. The cargo containment apparatus of claim 1 comprising at least three of said main panel members oriented in substantially parallel orientation and being connected by respective said elongated link members extending between a first said main panel member and a second said main panel member, and respective said link members extending between said second said main panel member and a third said main panel member.

3. The cargo containment apparatus of claim 2 wherein said link members permit movement of each said main panel member relative to each adjacent said main panel member while maintaining said substantially parallel orientation to vary a size dimension of said confined area between said adjacent main panel members.

4. The cargo containment apparatus of claim 3 wherein said link members comprise end panels interconnecting adjacent said main panel members, said end panels having a height substantially equal to said main panel members.

5. The cargo containment apparatus of claim 4 wherein at least one of said end panels and said main panel members are formed with bag hooks on at least one edge thereof.

6. The cargo containment apparatus of claim 5 wherein each said main panel member is formed with a pin projecting outwardly therefrom parallel to a pivot axis of said main panel member to engage carpet material in said cargo area and restrict any sliding movement of said apparatus within said cargo area.

7. The cargo containment apparatus of claim 3 wherein said link members are elongated members having a height dimension substantially smaller than said main panel members, at least two of said link members being required at each pivot axis of said main panel members, one of said link members being located at an upper portion of the corresponding said pivot axis and one of said link members being located at a lower portion of the corresponding said pivot axis.

8. The cargo containment apparatus of claim 3 wherein each said link member is formed with a full-size pivot head on one end thereof and a half-size pivot head on an opposing end thereof, said half-size pivot head being cooperable with a corresponding half size pivot head of another link member to form a full-size pivot head for engagement with said main panel member.

9. The cargo containment apparatus of claim 3 wherein each said main panel member is connected to an adjacent said main panel member at only one respective end thereof to form a serial orientation of said cargo containment apparatus, said link members connect one end of said main panel member to a corresponding end of said adjacent main panel member to permit pivotal movement of said main panel member relative to said adjacent main panel member with said link members being movable through an arc of approximately 180 degrees.

10. The cargo containment apparatus of claim 9 wherein said main panel members are serially connected to form a continuous loop of said main panel members.

11. The cargo containment apparatus of claim 10 wherein said main panel members are pivotally movable in free form to define said confined area in variable configurations.

12. A cargo containment apparatus for use in the cargo area of an automotive vehicle comprising:

at least three panel members;

a first set of vertically spaced, parallel elongated link members interconnecting a first said panel member to a second said panel member to permit relative pivotal movement between said first and second panel members; and a second set of vertically spaced, parallel elongated link members interconnecting said second said panel member to a third panel member to permit relative pivotal movement between said second and third panel members, the movement of said panel members defining a variably sized confined area between said panel members to contain items placed into said confined area from moving throughout said cargo area, each of said link members being pivotally movable through a range of motion defining an arc of at least ninety degrees.

13. The cargo containment apparatus of claim 12 wherein said panel members are formed with bag hooks suitable for engagement with handles of plastic grocery bags placed into said confined area.

14. The cargo containment apparatus of claim 12 wherein said panel members are formed with pins projecting outwardly therefrom to engage carpet material placed within said cargo area to restrict movement of said panel members over said cargo area.

15. The cargo containment apparatus of claim 12 wherein said panel members are connected in a substantially parallel orientation, the respective sets of link members maintaining said panel members in said substantially parallel orientation.

16. The cargo containment apparatus of claim 12 wherein said panel members are connected in a serial orientation to permit movement of each said panel member through an arc of approximately 180 degrees relative to each adjacent said panel member.

17. A cargo containment apparatus for use in the cargo area of an automotive vehicle comprising:

at least three panel members;

a first set of link members interconnecting a first said panel member to a second said panel member to permit relative pivotal movement between said first and second panel members; and a second set of link members interconnecting said second said panel member to a third panel member to permit relative pivotal movement between said second and third panel members, the movement of said panel members defining a variably sized confined area between said panel members to contain items placed into said confined area from moving throughout said cargo area, said panel members being connected in a serial orientation to permit movement of each said panel member through an arc of approximately 180 degrees relative to each adjacent said panel member, said link members being snap-fit into hinge pockets formed in each end of said panel member.

18. The cargo containment apparatus of claim 17 wherein said panel members are interconnected to form into a continuous linkage.

* * * * *